(12) United States Patent
Austin

(10) Patent No.: US 12,407,197 B1
(45) Date of Patent: Sep. 2, 2025

(54) PROXIMITY DEVICE FOR ELECTRONIC DEVICES AND UTILIZATION METHOD

(71) Applicant: Michael Austin, Plantation, FL (US)

(72) Inventor: Michael Austin, Plantation, FL (US)

( * ) Notice: Subject to any disclaimer, the term of this patent is extended or adjusted under 35 U.S.C. 154(b) by 0 days.

(21) Appl. No.: 19/085,572

(22) Filed: Mar. 20, 2025

(51) Int. Cl.
H04W 4/02 (2018.01)
G01S 11/06 (2006.01)
H02J 50/90 (2016.01)

(52) U.S. Cl.
CPC .............. H02J 50/90 (2016.02); G01S 11/06 (2013.01); H04W 4/023 (2013.01)

(58) Field of Classification Search
CPC .......... H02J 50/90; G01S 11/06; H04W 4/023
USPC ...................................................... 455/41.3
See application file for complete search history.

(56) References Cited

U.S. PATENT DOCUMENTS

| | | | |
|---|---|---|---|
| 12,206,258 B2 * | 1/2025 | Lim .......................... | H02J 50/40 |
| 2017/0346635 A1 * | 11/2017 | Gummeson ............... | G06F 1/16 |
| 2020/0006988 A1 * | 1/2020 | Leabman .................. | A61B 8/56 |
| 2020/0250654 A1 * | 8/2020 | Garrett ................. | G06Q 20/353 |
| 2020/0286070 A1 * | 9/2020 | Garrett ................. | G06Q 20/229 |
| 2020/0375605 A1 * | 12/2020 | Walsh .................. | A61M 60/873 |
| 2020/0403454 A1 * | 12/2020 | Chen ........................ | H02J 7/345 |
| 2021/0106281 A1 * | 4/2021 | Tran ....................... | A61B 5/486 |
| 2022/0160309 A1 * | 5/2022 | Poltorak .............. | A61B 5/7264 |
| 2023/0169489 A1 * | 6/2023 | Garrett ................. | G06Q 20/363 |
| | | | 705/64 |

* cited by examiner

*Primary Examiner* — April G Gonzales
(74) *Attorney, Agent, or Firm* — Johnson | Dalal; Mark C. Johnson

(57) ABSTRACT

A proximity device for electronic devices that includes a proximity device housing with a Bluetooth low energy (BLE) component disposed therein and communicatively coupled to an electronic communication device, an inductive charging coil disposed within the housing, and a battery electrically couplable to the BLE component and the inductive charging coil, wherein the device is operably configured to measure an actual distance between the BLE component and the electronic communication device with the BLE component, operably configured generate an audible proximity alarm when the actual distance exceeds a threshold distance, and operably configured to communicate an action request to the electronic communication device when the actual distance exceeds the threshold distance, the action request causing an audible device alarm by the electronic communication device.

13 Claims, 8 Drawing Sheets

PROXIMITY DEVICE FOR ELECTRONIC DEVICES AND UTILIZATION METHOD

FIELD OF THE INVENTION

The present invention relates generally to a device and method for monitoring distance between an electronic device and a proximity device and, more particularly, relates to a proximity monitoring device configured to generate an alarm when a threshold distance is reached between the electronic device (e.g., a phone or tablet) and the proximity device, thereby minimizing the likelihood of losing or misplacing the electronic device.

BACKGROUND OF THE INVENTION

Personal electronic devices, such as a cellphone and/or a tablet, have become ubiquitous around the world. These personal electronic devices store personal information regarding the user and other matters, in addition to being utilized for many uses by the user, including for work and personal use. To that end, these personal electronic devices are heavily relied on by users and the inadvertent misplacement of the electronic device or losing the device entirely is extremely problematic for most individuals.

As such, many personal electronic devices have tracking software installed thereon for users to access the last known location of said device and/or cause the device to alert on demand by user should the electronic device by misplaced or lost. Like many known tracking methods and devices, these devices and methods require networking capabilities, like publicly accessible Wi-Fi. Further, these alerting or tracking devices and methods come post hoc the misplacement or loss. There are also some known devices and methods that permit a user to track an electronic device by carrying a tracking device along with the electronic device, but these devices are also often misplaced, do not provide perceptive alert when a proximity distances threshold is reached, and also quickly drain power (requiring battery replacement).

Therefore, a need exists to overcome the problems with the prior art as discussed above.

SUMMARY OF THE INVENTION

The invention provides a proximity device for electronic devices and utilization method that overcomes the hereinafore-mentioned disadvantages of the heretofore-known devices and methods of this general type and that provides a proximity alert device, system, and method configured to help users avoid losing or forgetting their electronic devices, e.g., smartphones or tablets. Specifically, the proximity device triggers an alarm on the said device and the communicatively coupled (e.g., paired) electronic device when the distance between them exceeds a user-defined range (e.g., 10 feet).

With the foregoing and other objects in view, there is provided, in accordance with the invention, a proximity device for electronic devices that includes an electronic communication device having an electronic display configured to display a user interface and a proximity device housing that has a Bluetooth low energy (BLE) component disposed therein and communicatively coupled to the electronic communication device, an inductive charging coil disposed therein, a battery electrically couplable to the BLE component and the inductive charging coil, is operably configured to measure an actual distance between the BLE component and the electronic communication device with the BLE component, is operably configured generate an audible proximity alarm when the actual distance exceeds a threshold distance, and is operably configured to communicate an action request to the electronic communication device when the actual distance exceeds the threshold distance, the action request causing an audible device alarm by the electronic communication device.

In accordance with another feature, an embodiment of the present invention includes the proximity device housing having an RFID reader communicatively coupled (directly or indirectly) to the BLE component, wherein the battery is electrically couplable to the RFID reader.

In accordance with a further feature of the present invention, the proximity device housing is fully enclosed and the BLE component operably configured to activate subject to the RFID reader reading an animation displayed on the user interface.

In accordance with yet another feature, an embodiment of the present invention also includes the proximity device housing having at least one LED operably configured to emit light when the actual distance exceeds the threshold distance and a vibration motor operably configured to emit a vibration when the actual distance exceeds the threshold distance.

In accordance with a further feature, an embodiment of the present invention also includes the electronic communication device having a network module communicatively coupled to the BLE component and a memory with a software application resident thereon and configured to execute a programmed user interface providing user control of the threshold distance.

In accordance with another feature, an embodiment of the present invention also includes the proximity device housing having a photosensor disposed therein and operably configured to read a light signal displayed on the user interface, the BLE component operably configured to activate subject to the photosensor reading the light signal displayed on the user interface.

In accordance with an exemplary feature of the present invention, the inductive charging coil defines an aperture with the photosensor disposed therein.

In accordance with yet another feature, an embodiment of the present invention also includes the proximity device housing having a base with a bottom wall defining a base aperture and with the inductive charging coil disposed proximal to the bottom wall and in an overlapping configuration with the base aperture and a cover coupled to the base and of a translucent material.

In accordance with a further feature of the present invention, the base is of an opaque material.

Also in accordance with the present invention, a method of utilizing a proximity device for alerting a user is disclosed that includes generating an animation on a user interface on an electronic communication device, placing a base aperture defined by a bottom wall of a proximity device housing over the animation and reading the animation with a photosensor disposed within the proximity device housing, activating a Bluetooth low energy (BLE) component disposed in the proximity device housing after reading a light signal from the animation, communicatively coupling the BLE component to the electronic communication device after activation of the BLE component, executing a software application resident on the electronic communication device and generating a user interface on the electronic communication device for controlling a device alerting protocol and an electronic device alerting protocol, measuring an actual distance between the BLE component and the electronic communication device with the BLE component and comparing the actual distance to a threshold distance to generate an alert trigger, and generating at least one of an audible alert, a visual alert, and a vibratory alert on both the electronic communication device and the proximity device housing after generating the alert trigger.

Although the invention is illustrated and described herein as embodied in a mity device for electronic devices and utilization method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from consideration of the following description in conjunction with the drawing figures, in which like reference numerals are carried forward. The figures of the drawings are not necessarily drawn to scale but, where applicable, may be utilized to support a particular structural configuration or geometric relationship between components utilized in the assembly.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the housing, namely from the bottom wall of the housing to an upper terminal surface of the housing (e.g., where an LED may be placed). The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
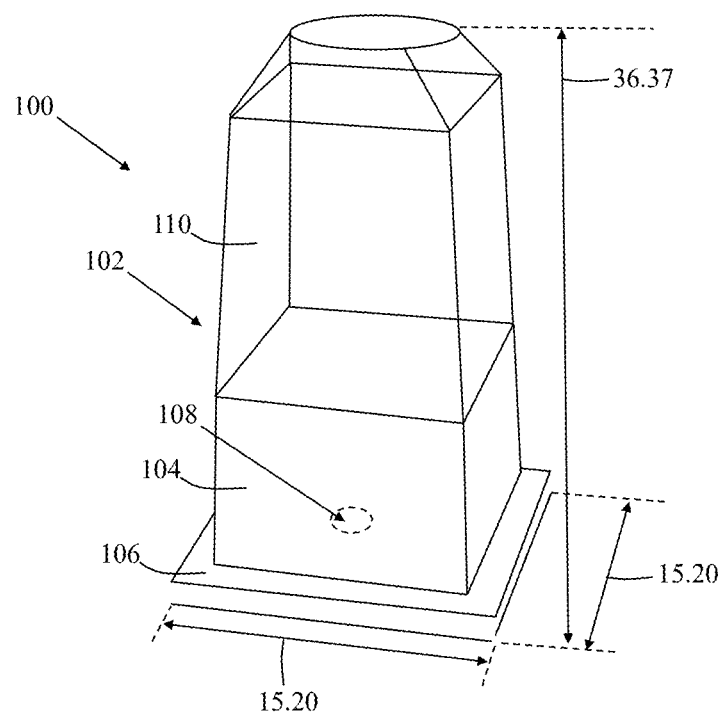
FIG. 1 is a perspective view of a proximity device for electronic devices in accordance with one embodiment of the present invention.

While the specification concludes with claims defining the features of the invention that are regarded as novel, it is believed that the invention will be better understood from consideration of the following description in conjunction with the drawing figures, in which like reference numerals are carried forward. It is to be understood that the disclosed embodiments are merely exemplary of the invention, which can be embodied in various forms.

The present invention provides a novel and efficient proximity device for electronic devices that can effectively and efficiently measure the distance (or proximity) between the electronic communication device and said proximity device, such as a cellphone or table, and alert the user that his or her electronic device has been left behind.

Figure 2:
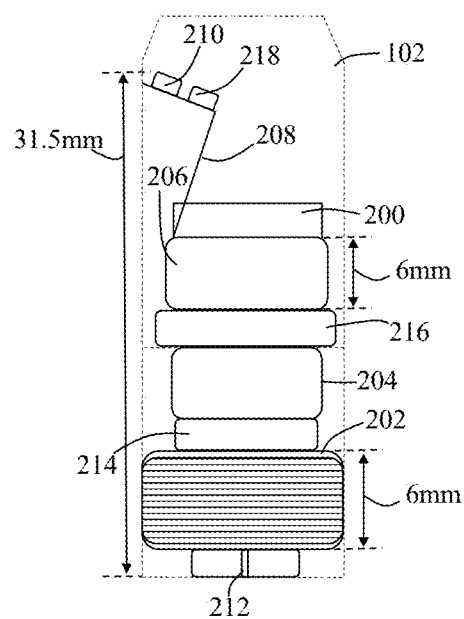
FIG. 2 is partially transparent and fragmentary view of the proximity device in FIG. 1.
Figure 3:
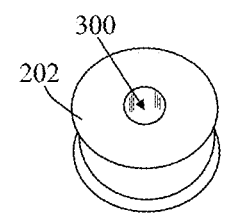
FIG. 3 is a perspective view of an inductive charging coil utilized with the proximity device in accordance with one embodiment of the present invention.
Figure 4:
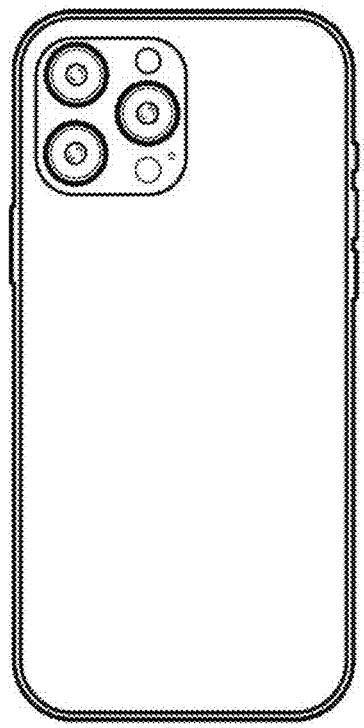
FIGS. 4-5 is elevational rear and front view of an exemplary electronic communication device utilized with the proximity device in accordance with one embodiment of the present invention.
Figure 5:
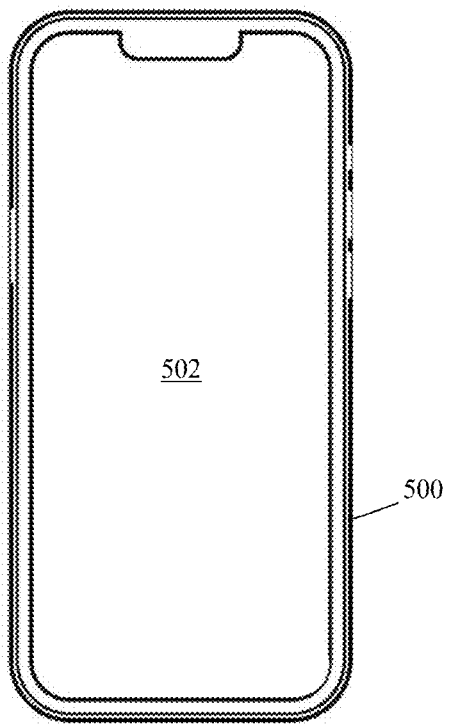

Referring now to FIGS. 1-3, one embodiment of the present invention and components utilized as part of the invention are shown in perspective views. The figures herein show several advantageous features of the present invention, but, as will be described below, the invention can be provided in several shapes, sizes, combinations of features and components, and varying numbers and functions of the components. The first example of a proximity device 100 for electronic devices, as specifically exemplified in FIGS. 1-3, includes a proximity device housing 102 that is configured to work in combination with an electronic communication device 500, exemplified in FIG. 5, having an electronic display 502 configured to display a user interface thereon. The electronic communication device 500 is preferably a personal electronic communication device with one or more processor(s), memory(ies), network module(s), battery(ies), vibration motor(s), LED(s), camera(s), etc., wherein, as those of skill in the art will appreciate, some components may be accessible or controlled by a user with one or more software applications resident on the memory of the electronic communication device.

The proximity device housing 102 beneficially includes a Bluetooth low energy (BLE) component 200 disposed therein and that is communicatively coupled to the electronic communication device 500, e.g., paired thereto using, for example, the network module of the electronic communication device, so as to communicate back-and-forth. The electronic communication device may be considered a "communication" device based on it having the network module and/or otherwise being configured to connect to another device over a network, including the Internet. Said another way, the electronic communication device may include a network module communicatively coupled to the BLE component 200 and a memory with a software application resident thereon that is configured to execute a programmed user interface providing user control of the threshold distance, along with other parameters associated with the operability of the components utilized in the proximity device housing 102.

The BLD component 200 utilizes ultra-high frequency (UHF) radio waves with frequencies around 2.4 gigahertz. The BLE component 200 may include a beacon tag, a receiver, and firmware with networking capabilities. The BLE component 200 beneficially includes or is otherwise communicatively coupled with an antenna. The housing 102 may also include a printed circuit board (PCB) with the BLE component 200 located thereon and/or other electrical components, including the LED(s) 210.

The proximity device housing 102 may be a fully enclosed structure with no buttons accessible or controllable by the user. The proximity device housing 102 may also be waterproof preventing liquid access therein, thereby allowing it to be used in various environments. The proximity device housing 102 may include a base portion (or "base") 104 and a cover portion (or "cover") 110 coupled to the base 104. The base 104 may include a bottom wall 106 defining a base aperture 108 and with an inductive charging coil 202 disposed within the proximity device housing 102 proximal to the bottom wall 106 and in an overlapping configuration with the base aperture 108. The base 104 is preferably made with a material (completely or partially to be effective) of an opaque material and the cover 110 is preferably made with a material (completely or partially to be effective) of a translucent material. A "translucent" material may be a transparent material or other material partially enabling light to be transported therethrough. Exemplary dimensions are provide in FIGS. 1-2, but the maximum thickness at the bottom of the cover 110 should be sufficient to enable a proper fit (e.g., a friction fit). The proximity device housing 102, including the base 104 and cover 110 may be a substantially rigid polymeric material, e.g., ABS plastic, and/or may be of a soft silicone material. The overall height of the proximity device housing 102 is preferably 36 mm (30-45 mm) and base may be approximately 15 mm×15 mm.

The proximity device housing 102 also beneficially includes a wireless charger, or in inductive charging coil 202 that may be approximately 6 mm in height and configured to electrically power a battery 204 disposed within the housing 102, the BLE component 200, and/or other electrical components in the housing 102. Specifically, the battery 204 may be electrically couplable to the BLE component 200 and the inductive charging coil 202, wherein the inductive charging coil 202 is configured in the housing 102 to periodically recharge the battery 204 when needed or desired. To effectuate the same, the user may place a bottom wall 106 of the housing 102, which may be substantially planar, or any other portion of the wall of the housing 102 where the inductive charging coil 202 is placed, against an external inductive charging assembly. The term "proximal" is defined as being at, adjacent, or near (within 15 mm) a referencing structure. As used herein, the term "wall" is intended broadly to encompass continuous structures, as well as separate structures that are coupled together so as to form a substantially continuous external surface.

Beneficially, the proximity device housing 102, namely the BLE component 200 and/or a processor resident on the housing 102, is operably configured to measure an actual distance between the BLE component 200 and the electronic communication device 500 (namely a network module resident thereon). As such, when the actual distance exceeds a threshold distance that may be programmed into the firmware as a default threshold distance or selectively modified by a user (e.g., using the software application resident on the electronic communication device), the proximity device housing 102, namely a vibration motor 206 that may be approximately 6 mm in height, is operably configured generate an audible proximity alarm. The vibration motor 206 may emit one or more vibrations for a determined or selectively modified period of time, and may also include a speaker or other transducer sufficient to generate an audibly perceivable alert from the proximity device housing 102.

The proximity device housing 102, namely through the BLE component 202 and/or network module, may be operably configured to wirelessly communicate an action request to the electronic communication device 500 when the actual distance exceeds the threshold distance. The action request, which could be a wireless call or command, triggers an audible device alarm by the electronic communication device 500. The audible device alarm may also be generated by speaker, vibration motor, or transducer on the electronic communication device 500. As such, when the proximity device housing 102 is left behind and the electronic communication device 500 is taken by the user, or vice versa, an audible, vibrational, and/or visual alert or cue is generated by both the electronic communication device 500 and the proximity device housing 102, thereby minimizing the likelihood of leaving behind the electronic communication device 500.

In one embodiment, the BLE component is operably configured to activate or be powered for connectivity, subject to an RFID reader and/or a photosensor reading and/or detecting an animation or light frequency displayed on the user interface 502 of the electronic communication device 500. Said another way, as the proximity device housing 102 may not have any buttons, the user will be required to place the housing 102 over the phone screen to read an animation. Based on the animation, the device turns on the BLE component 200, and the electronic communication device 500 then pairs with it. To that end, the RFID reader may be communicatively coupled (directly or indirectly) to the BLE component 200 and electrically coupled to the battery 204.

The photosensor or phototransistor 212 may be disposed within the proximity device housing 102 and is operably configured to read a light signal displayed on the user interface 502, wherein the BLE component 200 may be operably configured to activate subject to the photosensor 212 reading the light signal displayed on the user interface 502. In one embodiment, the inductive charging coil 202 defines an aperture 300 therethrough with the photosensor 212 disposed therein. To effectuate efficient operability of the assembly, the aperture 300 may be of a diameter of approximately 2 mm and the inductive charging coil 202 may include a core of ferrite material formed in a toroid shape. The aperture of 300 of the charging coil 202 may be preferably aligned with the base aperture 108 to enable a sufficient amount of light to enter.

In one embodiment, the device 100 also includes a capacitive proximity sensor 218 housed in the proximity device housing 102. The capacitive proximity sensor 218 is configured to create an electric field around a sensing surface, which is preferably ambient to the housing 102, namely the cover portion 110. When an object approaches this field, e.g., a user's hand or other object, it alters the capacitance, which the sensor 218 detects. The capacitive proximity sensor 218 may be integrated on the PCB 208 and may include a small electrode enabling proximity detection. As such, the capacitive proximity sensor 218 may be electrically coupled to the battery 204 and operably configured to generate an electric field outside of the proximity device housing 102 and an electronic signal to generate the audible proximity alarm when a capacitance difference is measured from a distortion of the electric field.

The firmware built on the PCB 208 may beneficially include instructions related to the utilization of the phototransistor 212 and the messages generated in the system. Specifically, a 4-bit sequence may be initiated, i.e., sequence "0000", to signal the beginning of a message. Then, a 16-bit data payload may be generated by the phototransistor 12, that includes the main content of the message, representing the actual information being transmitted that is received, for example, from the user interface 502. Then, a 1-bit parity is generated and calculated from the 16-bit data payload. Thereafter, an 8-bit cyclic redundancy check (CRC) value is generated and calculated from the 16-bit data payload. To effectuate proper handling of the information in small housing utilizing a BLE component 200, an exemplary program as follows may be utilized:

With reference specifically to FIG. 2, the proximity device housing includes one or more LEDs, that may be configured to generate red/green/blue light frequencies or are otherwise operably configured to emit light when the actual distance exceeds the threshold distance. The assembly 100 may also include a vibration motor 206 operably configured to emit a vibration when the actual distance exceeds the threshold distance. The vibration motor may be direct current (DC) 3-volt 12,000 RPM motor that is approximately 5-10 mm in diameter.

Figure 6:
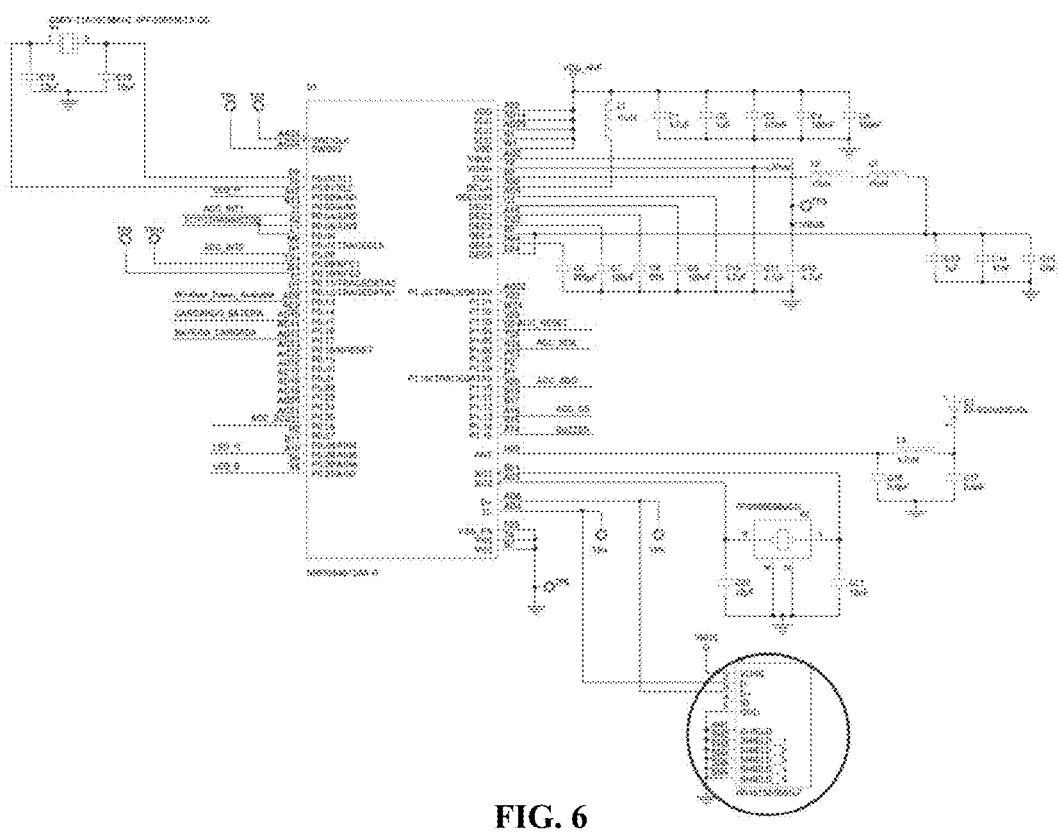
FIGS. 6-8 depict exemplary circuit diagrams illustrating the electrical coupling and configuration of the components in accordance with one embodiment of the present invention.
Figure 7A:
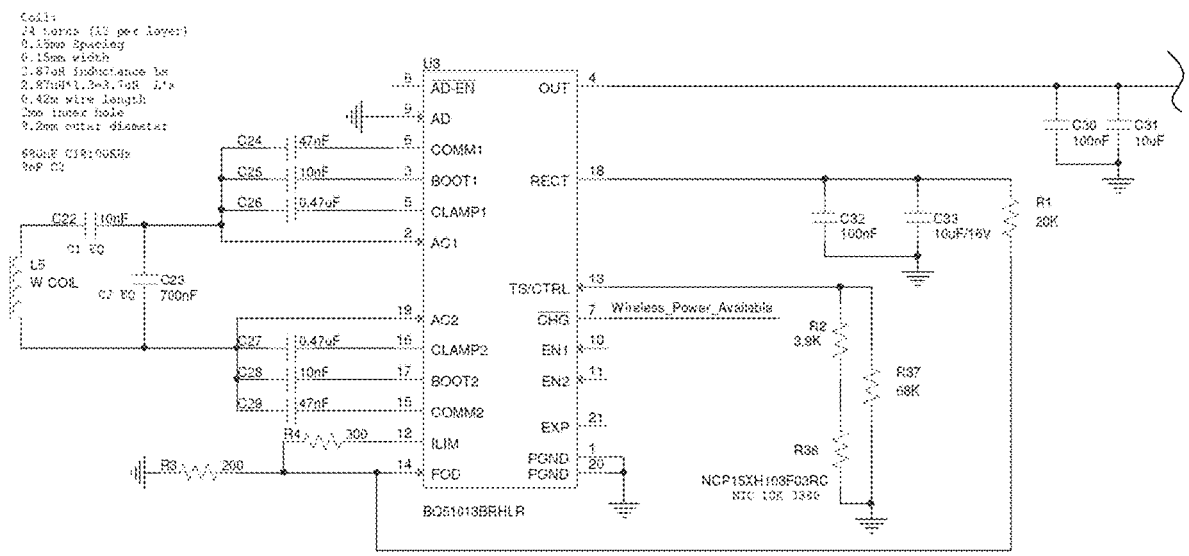
Figure 7B:
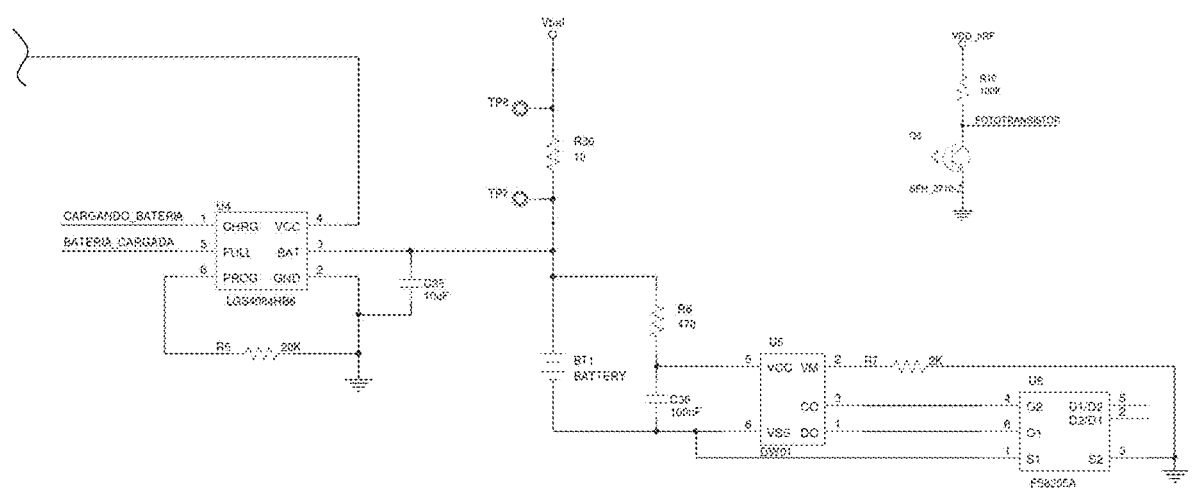
Figure 8:
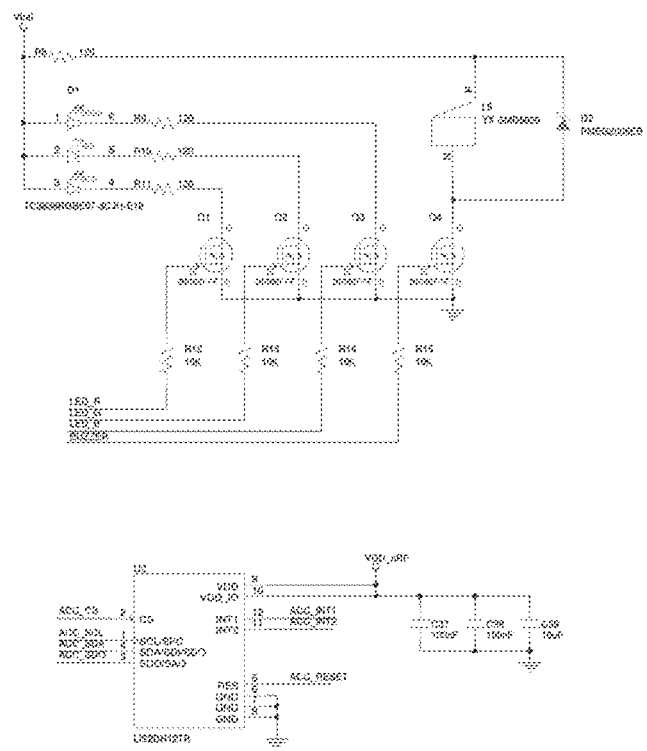

With reference to the circuit diagrams in FIGS. 6-8, the BLE component 200 and other components may include various read, write, notify permissions and coding sufficient to effectuate the purposes of the present invention. Specifically, with respect to the batter level characteristics, a universally unique identifier (UUID) of 0x2A19 may be utilized and indicates the battery level of the device. The permissions may be set to Read, Notify, the data type may be set to "uint8_t" (Battery level as a percentage, 0-100), and notifications are Enabled. FIGS. 7a-b depict fragmented circuit diagrams depicting the BLE component 200, including the battery, motor, coil, and phototransistor.

With respect to the received signal strength indicator or percentage, or RSSI, the higher the RSSI number, the stronger the signal. Unlike RX, RSSI is a relative measurement and includes UUID of 3616a308-6332-4079-9278-2b069f692087 may be utilized and indicates the RSSI. The permissions may be set to Read, Notify, the data type may be set to "int8_t" (RSSI value in dBm), and notifications are Enabled.

With respect to the distance characteristics, or RSSI, a UUID of 3616a308-6332-4079-9278-2b069f692089 may be utilized and measures the distance from a reference point based on RSSI. The permissions may be set to Read, Notify, the data type may be set to "uint16_t" (Distance in centimeters), and notifications are Enabled.

With respect to the max distance characteristics, a UUID of 3616a308-6332-4079-9278-2b069f69208A may be utilized and represents the maximum distance permitted before the device enters alert mode. The permissions may be set to Read, Write Without Response, and Notify, the data type may be set to "uint16_t" (Distance in centimeters), and notifications are Enabled.

With respect to the melody characteristics, a UUID of 3616a308-6332-4079-9278-2b069f692088 may be utilized and updates the melody for different events (success, alert, error). The permissions may be set to Read, Write Without Response, and Notify, the data type may be set to "uint8_t [17]", and notifications are Enabled. The first byte indicates

```
uint8_t calculate_crc8(uint16_t bit_sequence)
{uint8_t poly = 0x07; // Polynomial for CRC (x^8 + x^2 + x + 1)
uint8_t crc = 0;
    for (int i = 0; i < 16; i++) {
    crc ^=((bit_sequence >> (15 − i)) & 0x01) << 7; // Extract the bit and shift it to XOR with
crc
        for (int j = 0; j < 8; j++) {
            if (crc & 0x80) {
                crc = (crc << 1) ^ poly;
            } else {
                crc <<= 1;
            }
        }
    }
}
crc &= 0xFF; // Ensure CRC is 8 bits
printf("Bit sequence: 0x%04X, CRC: 0x%02X\n", bit_sequence, crc);
return crc;
}
``` a melody type (0 for success, 1 for alert, 2 for error) and next 16 bytes indicates melody data as note-duration pairs (4 pairs of uint16_t note, uint16_t duration).

With respect to the phototransistor characteristics, a UUID of 3616a308-6332-4079-9278-2b069f692086 may be utilized and reads the value from a phototransistor sensor 212. The permissions may be set to Read and Notify, the data type may be set to "uint16_t" (Sensor value), and notifications are Enabled.

With respect to the power characteristics, a UUID of 3616a308-6332-4079-9278-2b069f69208B may be utilized and provides the transmission power level. The permissions may be set to Read and Notify, the data type may be set to "int8_t" (Power level in dBm) (Sensor value), and notifications are Enabled.

With respect to play melody characteristics, a UUID of 3616a308-6332-4079-9278-2b069f69208C may be utilized and triggers the playback of a predefined melody. The permissions may be set to write without response and notify, the data type may be set to "int8_t" (indicating which melody to play: 0 for success, 1 for alert, 2 for error), and notifications are Enabled.

With respect to activate the RGB LEDs characteristics, a UUID of 3616a308-6332-4079-9278-2b069f69208E may be utilized for allowing calibration of the transmission power level for more accurate distance estimation. The permissions may be set to read, write, and notify, the data type may be set to "uint8_t" (transmission power level in dBm), and notifications are Enabled.

With respect to TX power calibration characteristics, a UUID of 3616a308-6332-4079-9278-2b069f69208D may be utilized and the intensity of the RGB LEDs, via PWM, is controlled. The permissions may be set to write and notify, the data type may be set to "uint8_t [3]" (an array representing the intensity for Red, Green, and Blue LEDs), and notifications are Enabled.

With respect to path loss exponent characteristics, a UUID of 3616a308-6332-4079-9278-2b069f69208F may be utilized and sets the path-loss exponent used in the distance estimation. The permissions may be set to read, write, and notify, the data type may be set to "uint8_t[3]" (an array representing the intensity for Red, Green, and Blue LEDs), and notifications are Enabled.

With respect to alert status characteristics, a UUID of 3616a308-6332-4079-9278-2b069f692090 may be utilized and represents the current alert status of the device. This characteristic is used to control and monitor the alert state. The device enters an alert state when certain conditions (such as exceeding a maximum distance) are met, and this characteristic allows the status to be read and modified. The permissions may be set to read, write without response, and notify, the data type may be set to "uint8_t" (alert status where 0 indicates no alert and 1 indicates an active alert), and notifications are Enabled.

With respect to maximum alert time characteristics, a UUID of 3616a308-6332-4079-9278-2b069f692092 may be utilized and configures the maximum duration (in seconds) that the device can remain in an alert state before automatically deactivating the alert. The permissions may be set to read and write without response, the data type may be set to "uint16_t" (maximum alert duration in seconds), and notifications are Disabled.

With respect to quit mode characteristics, a UUID of 3616a308-6332-4079-9278-2b069f692093 may be utilized and allows enabling or disabling of the distance-based alarm. When set to 1, distance checks and alarm activation due to distance are disabled. The permissions may be set to read and write, the data type may be set to "uint8_t" (0: Normal mode, 1: Quiet mode), and notifications are Disabled.

With respect to alarm block time characteristics, a UUID of 3616a308-6332-4079-9278-2b069f692094 may be utilized and defines the time in seconds that must pass after an alarm is deactivated before a new alarm can be triggered due to distance. This prevents immediate re-triggering of the alarm. The permissions may be set to read and write, the data type may be set to "uint16_t" (time in seconds), and notifications are Disabled.

With respect to alert wait time characteristics, a UUID of 3616a308-6332-4079-9278-2b069f692095 may be utilized and configures the time (in milliseconds) to wait after each iteration of the main loop, particularly after checking for alert conditions. The permissions may be set to read and write, the data type may be set to "uint16_t" (time in seconds), and notifications are Disabled.

In one embodiment, the assembly 100 may include an accelerometer and/or gyroscope (represented collectively with numeral 216 in FIG. 2). This combination allows for precise measurement of linear and angular movements, significantly expanding the device 100 capabilities. Specifically, the accelerometer and/or gyroscope are configured to measure movements, wherein a low-power sleep state may be enabled when the device remains stationary for a defined period, e.g., 30 seconds. Moreover, the accelerometer and/or gyroscope 216 are preferably integrated on a single integrated circuit, thereby preserving space on the device 100 to maintain its relatively small size. The accelerometer and/or gyroscope 216 also enables more effective alarm deactivation (namely allowing for intuitive alarm deactivation through device rotation), alert initiation (namely triggering an alert mode through a simple shake gesture), activity tracking (namely providing step measurement functionality), and safety protection (namely detecting drops of the assembly).

In another feature of the present invention, the device 100 may include gesture-based identity validation, wherein the device 100 includes electrical components, e.g., accelerometer and gyroscope 216, configured to learn and validate unique movement sequences. For example, the movement sequences serve as secure credentials, transmitting an encrypted key to authorized devices upon successful validation or for entering and exiting a low power state of the assembly 100. This would be particularly useful for secure replacement for bank security tokens, prevention of virtual impersonation, and access control for doors and cabinets. Some movement sequences may include discreet hand movements with the device in a pocket or bag, complex rotational sequences, similar to a safe combination, for unlocking cabinets, emergency messages trigger through a defined series of shakes. The gesture-based identity validation may also be utilized to verify identity during deep fake calls by requesting and validating a gesture code, with validation feedback through email, text, or device LED/audio cues.

Figure 9:
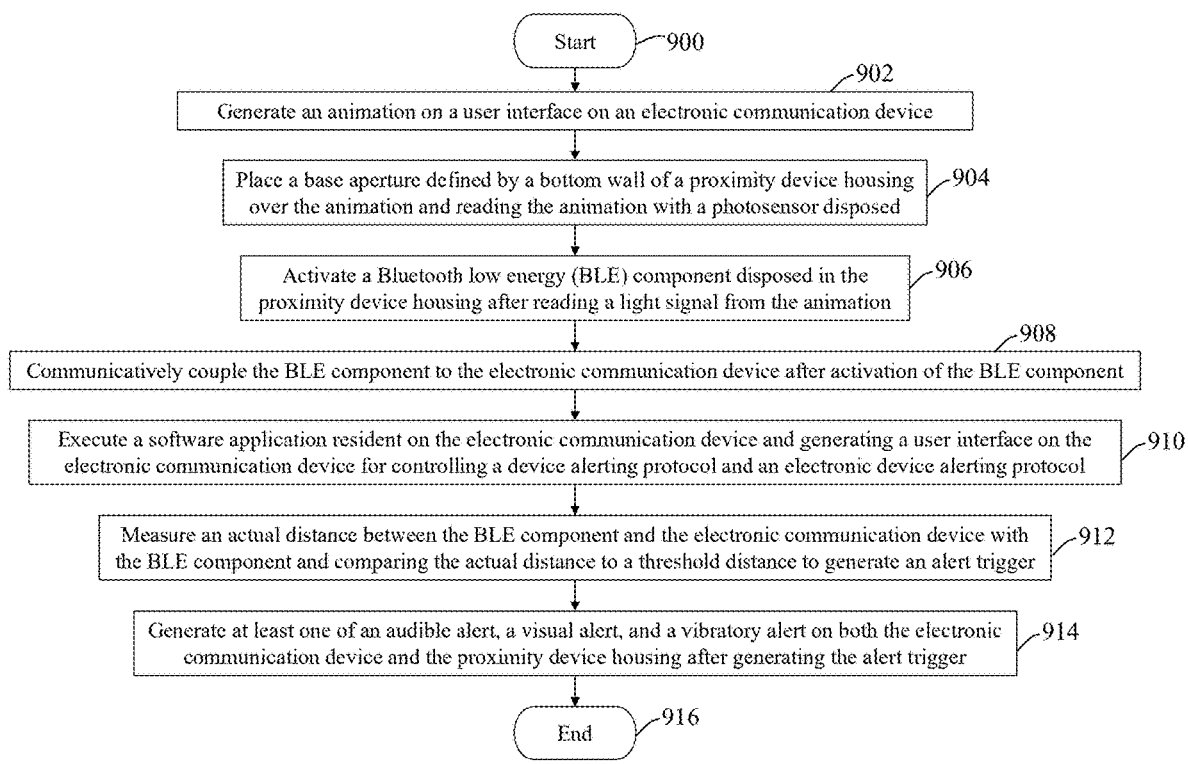
FIG. 9 depicts an exemplary process flow diagram for a method of utilizing a proximity device for altering a user in accordance with one embodiment of the present invention.

FIGS. 1-3 will now be described in conjunction with the process flow chart of FIG. 9. Although FIG. 9 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 9 for the sake of brevity. In some embodiments, some or all of the process steps included in FIG. 9 can be combined into a single process.

More specifically, the process of utilizing a proximity device for alerting a user may begin at step 900 and then immediately proceeds to step 902 generating an animation on a user interface 502 on the electronic communication device 500. This may include executing the software application on the electronic communication device 500 to generate the animation or light frequency. Next, step 904 may include placing the base aperture 108 defined by the bottom wall 106 of a proximity device housing 102 over the animation and reading the animation with the photosensor 212 disposed within the proximity device housing 102.

Next, step 906 includes activating the BLE component 200 disposed in the proximity device housing 102 after reading a light signal from the animation. Said another way, the BLE component 200 is otherwise inactive and does not receive power until activated. Once the BLE component 200 is activated, step 908 includes communicatively coupling the BLE component 200 to the electronic communication device 500. Step 910 may include executing (initially or continuing to run) a software application resident on the electronic communication device 500 and generating a user interface on the electronic communication device 500 for controlling a device alerting protocol and an electronic device alerting protocol. The device alerting protocol may include one or more parameters associated with alerts generated by the proximity device housing 102, e.g., threshold distance, LED light intensity, LED light duration, LED light pulsation, LED light color, vibration intensity, vibration duration, audible intensity, audible duration, power level, and interoperability of the vibration motor 206, LED(s) 210, transducer 214. The electronic device alerting protocol may include one or more parameters associated with alerts generated by the electronic communication device 500, e.g., LED light intensity, LED light duration, LED light pulsation, vibration intensity, vibration duration, audible intensity, audible duration, power level, and interoperability of its electrical and/or electric-mechanical components.

Next step 912 includes measuring an actual distance between the BLE component 200 and the electronic communication device 500 with the BLE component 200 and comparing the actual distance to a threshold distance to generate an alert trigger. The alert trigger may be prompt or command that initiates one or more alerts from the electronic communications device 500 and/or from the proximity device housing 110. Specifically, step 914 may include generating at least one of an audible alert, a visual alert, and a vibratory alert on both the electronic communication device and the proximity device housing after generating the alert trigger. Said another way, all, or one or more, of the audible alert(s) from the vibration motor 206 and/or transducer 214, a visual alert(s) from the LED(s) 210, and vibratory alert(s) from the vibration motor 206 on either or both of the respective the electronic communication device 500 and the proximity device housing 102 are generated after creating the alert trigger (which may be internally communicated within the proximity device housing 102 or communicated to the electronic communication device 500).

In one embodiment, the method includes providing the proximity device 102 with at least one LED 210 and a vibration motor 200 and providing the electronic communication device 500 with at least one LED and a vibration motor, wherein an audible alert, a visual alert, and a vibratory alert are generated from both the electronic communication device 500 and the proximity device housing 102 with the respective at least one LED and the vibration motor on the respective proximity device 102 and electronic communication device 500. The method may also include controlling the threshold distance and at least one of an intensity and duration of the at least one of an audible alert, a visual alert, and a vibratory alert on both the electronic communication device and the proximity device housing with the user interface on the electronic communication device, wherein the threshold distance and the at least one of an intensity and duration of the at least one of an audible alert, a visual alert, and a vibratory alert form part of the device alerting protocol and the electronic device alerting protocol.

Beneficially, the process may also include electrically charging a battery within the proximity device housing with an inductive charging coil disposed within the proximity device housing, wherein the battery is electrically couplable to the BLE component. The process may terminate at step 916.

As such, a proximity alert assembly for use with electronic communication devices, such as cellphones or tablets, has been disclosed and effectuates a low cost and long-term solution to the known problems in the art.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A proximity device for electronic devices comprising:
   an electronic communication device having an electronic display configured to display a user interface; and
   a proximity device housing:
      having a Bluetooth low energy (BLE) component disposed therein and communicatively coupled to the electronic communication device;
      having an inductive charging coil;
      having a battery electrically couplable to the BLE component and the inductive charging coil;
      an RFID reader communicatively coupled to the BLE component, the battery electrically couplable to the RFID reader;
      fully enclosed, wherein the BLE component is operably configured to activate subject to the RFID reader reading an animation displayed on the user interface;
      operably configured to measure an actual distance between the BLE component and the electronic communication device with the BLE component;
      operably configured generate an audible proximity alarm when the actual distance exceeds a threshold distance; and
      operably configured to communicate an action request to the electronic communication device when the actual distance exceeds the threshold distance, the action request causing an audible device alarm by the electronic communication device.

2. The proximity device for electronic devices according to claim 1, wherein the proximity device housing further comprises:
   at least one LED operably configured to emit light when the actual distance exceeds the threshold distance; and
   a vibration motor operably configured to emit a vibration when the actual distance exceeds the threshold distance.

3. The proximity device for electronic devices according to claim 1, wherein the electronic communication device further comprises:
   a network module communicatively coupled to the BLE component; and a memory with a software application resident thereon and configured to execute a programmed user interface providing user control of the threshold distance.

4. The proximity device for electronic devices according to claim 1, wherein the proximity device housing further comprises:
a photosensor disposed therein and operably configured to read a light signal displayed on the user interface, the BLE component operably configured to activate subject to the photosensor reading the light signal displayed on the user interface.

5. The proximity device for electronic devices according to claim 4, wherein the inductive charging coil defines an aperture with the photosensor disposed therein.

6. The proximity device for electronic devices according to claim 1, wherein the proximity device housing further comprises:
a base with a bottom wall defining a base aperture and with the inductive charging coil disposed proximal to the bottom wall and in an overlapping configuration with the base aperture; and
a cover coupled to the base and of a translucent material.

7. The proximity device for electronic devices according to claim 1, further comprising:
a capacitive proximity sensor housed in the proximity device housing, electrically coupled to the battery, and operably configured to generate an electric field outside of the proximity device housing and an electronic signal to generate the audible proximity alarm when a capacitance difference is measured from a distortion of the electric field.

8. A method of utilizing a proximity device for alerting a user including the steps of:
generating an animation on a user interface on an electronic communication device;
placing a base aperture defined by a bottom wall of a proximity device housing over the animation and reading the animation with a photosensor disposed within the proximity device housing;
activating a Bluetooth low energy (BLE) component disposed in the proximity device housing after reading a light signal from the animation;
communicatively coupling the BLE component to the electronic communication device after activation of the BLE component;
executing a software application resident on the electronic communication device and generating a user interface on the electronic communication device for controlling a device alerting protocol and an electronic device alerting protocol;
measuring an actual distance between the BLE component and the electronic communication device with the BLE component and comparing the actual distance to a threshold distance to generate an alert trigger; and
generating at least one of an audible alert, a visual alert, and a vibratory alert on both the electronic communication device and the proximity device housing after generating the alert trigger.

9. The method according to claim 8, further comprising:
providing the proximity device with at least one LED and a vibration motor and providing the electronic communication device with at least one LED and a vibration motor; and
generating an audible alert, a visual alert, and a vibratory alert on both the electronic communication device and the proximity device housing with the respective at least one LED and the vibration motor on the respective proximity device and electronic communication device.

10. The method according to claim 8, further comprising:
controlling the threshold distance and at least one of an intensity and duration of the at least one of an audible alert, a visual alert, and a vibratory alert on both the electronic communication device and the proximity device housing with the user interface on the electronic communication device, wherein the threshold distance and the at least one of an intensity and duration of the at least one of an audible alert, a visual alert, and a vibratory alert form part of the device alerting protocol and the electronic device alerting protocol.

11. The method according to claim 8, further comprising:
electrically charging a battery within the proximity device housing with an inductive charging coil disposed within the proximity device housing, the battery electrically couplable to the BLE component.

12. The method according to claim 11, wherein the
the inductive charging coil is disposed proximal to the bottom wall and in an overlapping configuration with the base aperture.

13. A proximity device for electronic devices comprising:
an electronic communication device having an electronic display configured to display a user interface; and
a proximity device housing:
having a Bluetooth low energy (BLE) component disposed therein and communicatively coupled to the electronic communication device;
having an inductive charging coil;
a base with a bottom wall defining a base aperture and with the inductive charging coil disposed proximal to the bottom wall and in an overlapping configuration with the base aperture;
a cover coupled to the base and of a translucent material;
having a battery electrically couplable to the BLE component and the inductive charging coil;
operably configured to measure an actual distance between the BLE component and the electronic communication device with the BLE component;
operably configured generate an audible proximity alarm when the actual distance exceeds a threshold distance; and
operably configured to communicate an action request to the electronic communication device when the actual distance exceeds the threshold distance, the action request causing an audible device alarm by the electronic communication device.

* * * * *